Patented Dec. 20, 1949

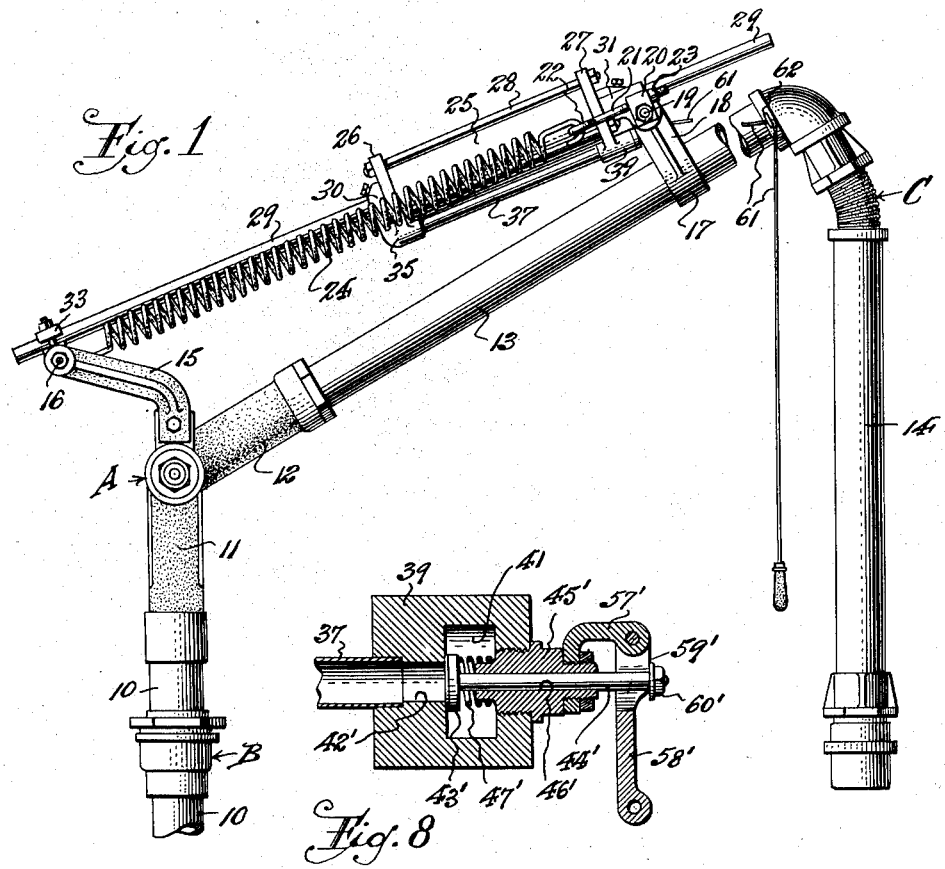
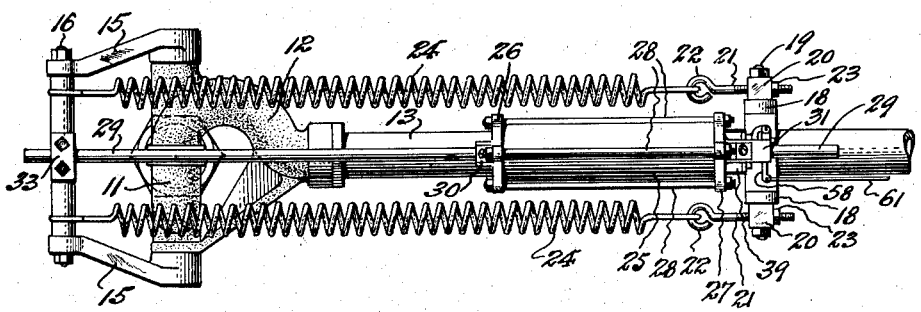

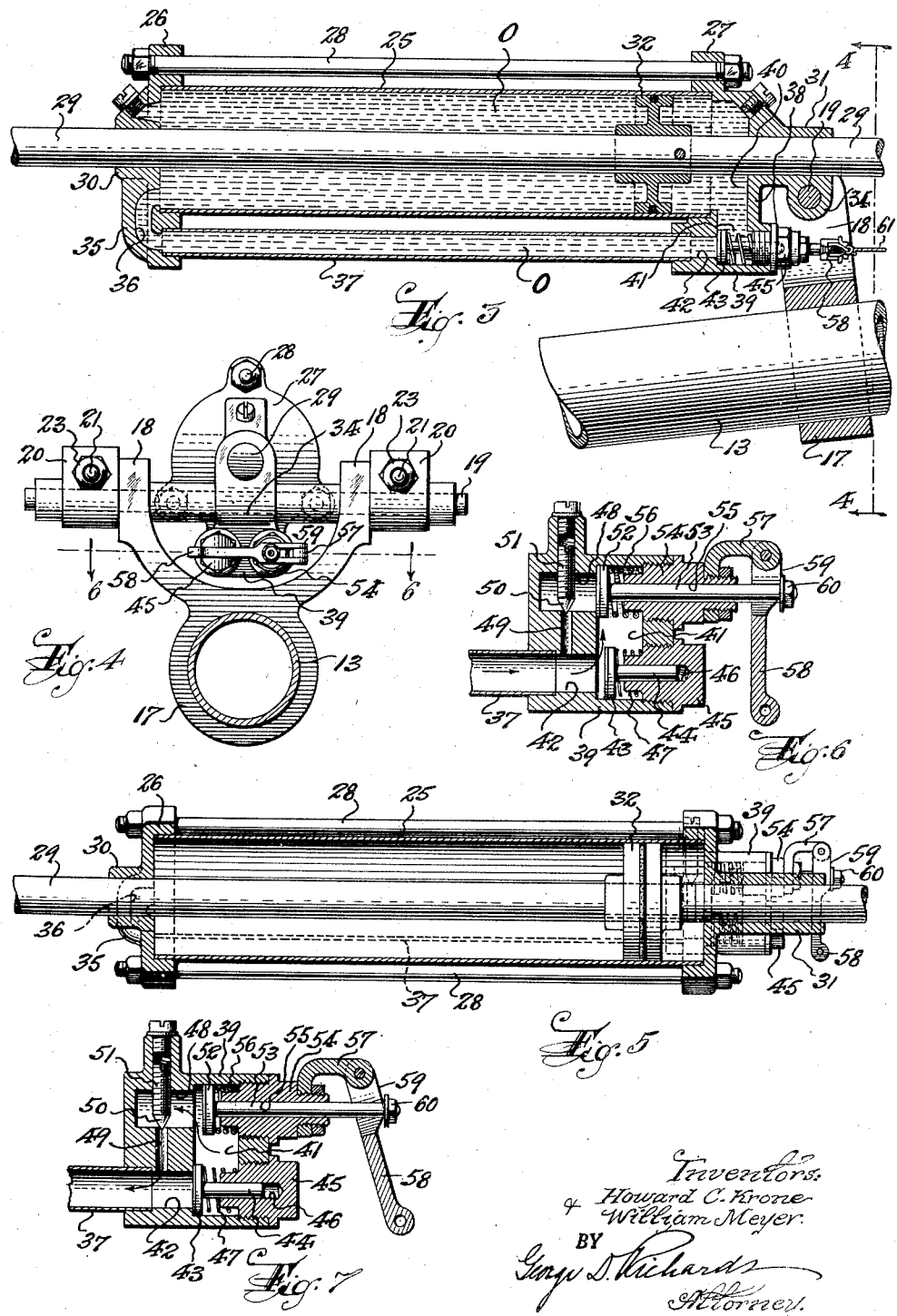

2,492,049

UNITED STATES PATENT OFFICE 2,492,049

AUTOMATIC HOLD-DOWN MEANS FOR SWING JOINT MOUNTED ARMS

Howard Chester Krone, Ridgewood, and William Meyer, East Orange, N. J., assignors to Wheaton Brass Works, Newark, N. J., a corporation of New Jersey Application October 5, 1948, Serial No. 52,948

9 Claims. (Cl. 137—21)

1

This invention relates to improvements in loading conduit systems for delivering liquids from supply sources, by either gravity or pump pressure, into containers, and especially for loading oil, gasolene or other liquids into tank trucks, railroad tank cars, aeroplane storage tanks or other containers in which such liquids are transported or shipped; and the invention has reference, more particularly, to a swing joint supported loading or discharge arm adapted to be swung up and down to optionally dispose the same in out of service position or in service position; this application being a continuation in part of our copending application Serial No. 22,304, filed April 21, 1948.

The invention has for an object to provide in combination with the swingable discharge arm of a loading conduit system, means to counterbalance said discharge arm to normal upswung out of service position, and releasable means for automatically holding said discharge arm in down-swung service position.

The invention has for another object to provide a novel construction of hydraulic check or detent means adapted to be actuated by down-swinging movement of the discharge arm of a loading conduit system, whereby to automatically hold said discharge arm in down-swung service position against upswinging thrust of counterbalancing means; said hydraulic check or detent means including manipulatable means operative to release its down holding effect upon the discharge arm.

A further object of the invention is to provide, in combination with the discharge arm of a loading conduit system, which arm is counterbalanced to up-swung out of service position, a hydraulic check or detent means comprising a relatively movable fluid filled cylinder and piston, and novel valve devices for so controlling the movement of fluid in the cylinder under piston impulsion, that minimum resistance is offered to manually induced down-swinging movement of the discharge arm to service position, so that such movement may be quickly and easily effected, but greater resistance to up-swinging movement of the discharge arm to out of service position is provided for, whereby the latter movement is automatically and more slowly effected so as to avoid shock stresses and strains.

Other objects of the invention, not at this time more particularly numerated, will be understood from the following detailed description of the same.

An illustrative embodiment of the invention is shown in the accompanying drawings, in which:

2

Fig. 1 is a side elevational view of a loading conduit system, the counterbalanced swingable discharge arm of which is equipped with an automatic hold down means in accordance with the invention; said discharge arm being shown in its up-swung out of service position; and Fig. 2 is a top plan view of the same, parts being broken away.

Fig. 3 is a fragmentary central longitudinal sectional view through the hold down means, but drawn on a somewhat enlarged scale; Fig. 4 is a cross-sectional view, taken on line 4—4 in Fig. 3; and Fig. 5 is a central horizontal longitudinal sectional view through the hold down means.

Fig. 6 is a fragmentary horizontal sectional view, through the valve members of the hold down means, taken on line 6—6 in Fig. 4, showing the check valve thereof open to fluid flow in one direction when the discharge arm is down-swung, this view being drawn on a further enlarged scale; and Fig. 7 is a view similar to that of Fig. 6, but showing the manipulatable valve thereof open to fluid flow in the opposite direction when the discharge arm is up-swung.

Fig. 8 is a view similar to that of Fig. 6 but showing a simplified form of valve means for controlling the circulating flow of liquid in the hold down means, wherein a single but manipulatable check-valve member is provided in the path of said flow.

Similar characters of reference are employed in the above described views, to indicate corresponding parts.

By way of illustration, the invention is shown as embodied in a loading conduit system of the general type disclosed in our prior United States Letters Patent No. 2,319,068, dated May 11, 1943, although it will be understood that the invention can be embodied in any other type of loading system or in any other apparatus which includes a swingable arm.

Referring to the drawings, the reference character 10 indicates a stand pipe of a loading conduit system which leads from a source of liquid or other fluid to be discharged, as e. g. from a storage tank for gasolene, oil or other liquid or fluid (not shown). The liquid or fluid may be delivered to and through the stand pipe 10 by gravity or pump pressure according to the type of tank and its location relative to the stand pipe, and suitable shut-off valve means (not shown) may be provided for controlling the delivery of liquid or fluid to the stand pipe 10.

Connected with and in communication with the stand pipe 10 is a swing joint A, the stationary receiving end portion 11 of which is connected to said stand pipe by a swivel joint B. To the movable discharge end portion 12 of the swing joint A is connected a discharge arm 13. To the free end of the discharge arm 13 is connected, preferably by a suitable articulating or flexible connection C, a drop pipe 14. To the free end of the drop pipe 14 may be connected any suitable form of manipulatable control or faucet valve (not shown), by which discharge flow of liquid or fluid from the discharge arm may be controlled.

Suitably supported in fixed connection with the stationary end portion 11 of the swing joint A are laterally spaced apart bracket arms 15. Supported by said bracket arms 15, so as to extend between the free end portions thereof is a transverse anchor rod or shaft 16. Fixed on the discharge arm 13, in suitable outwardly spaced relation to the swing joint A, is a collar 17 provided with upwardly extending, laterally spaced yoke arms 18. Supported by said yoke arms 18, so as to extend through and between the free end portions thereof, is another transverse anchor rod or shaft 19. Mounted to swivel on the end portions of said anchor rod or shaft 19 are attachment blocks 20 through which extend the threaded shanks 21 of coupling eyes 22, the same being longitudinally adjustable by means of retaining nuts 23 which are engaged on the threaded shanks 21. Connected between the anchor rod or shaft 16 and the coupling eyes 22 are pull springs 24. As thus arranged, these pull springs 24 counterbalance the discharge arm 13 to its normal up-swung out of service position shown in Fig. 1.

The hydraulic check or detent means, which constitutes the hold down means for the discharge arm 13, comprises a cylinder 25 which is closed at its inner end by a head member 26 and at its outer end by a head member 27. These head members 26 and 27 are held in assembled relation to the cylinder ends by tie-bolts or rods 28, which extend between said head members exteriorly of the cylinder. A piston rod 29 extends axially through the cylinder 25, being slidably supported by central hubs 30 and 31 with which the respective inner and outer head members 26 and 27 are provided, so that the piston rod 29 extends entirely through the cylinder interior. Fixed on the piston rod 29 within the cylinder 25, is a piston 32. The inner end of the piston rod 29 is suitably affixed or clamped to a swivel block 33 which is mounted on the anchor rod or shaft 16, thus anchoring said piston rod 29 and piston 32 against longitudinal movement. The hub 31 of head 27 of the cylinder 25 is provided with a dependent perforate knuckle 34 which is pivotally anchored on the anchor rod or shaft 19, so that up and down swinging movements of said discharge arm 13 will impart longitudinal movements to the cylinder 25 relative to the fixed piston rod 29 and piston 32.

The inner head member 26 is provided with a suitably shaped boss or extension 35 which is cored to provide a fluid passage 36 which leads outwardly from the inner end of the interior of the cylinder 25. A by-pass conduit or pipe 37 is connected by one end to the boss or extension 35 in communication with the fluid passage 36.

The outer head member 27 is also provided with a suitably shaped boss or extension 38 which terminates in a valve housing section 39. Said boss or extension 38 is cored to provide a fluid passage 40 which leads outwardly from outer end of the interior of the cylinder 25 to communicate with a valve chamber 41 with which the valve housing section 39 is provided. The valve housing section 39 is provided, adjacent to one side thereof, with a primary port 42 which opens out from the interior of the valve chamber 41. The by-pass conduit or pipe 37 is connected by its opposite end to the valve housing extension 39 in communication with said primary port 42. Said primary port 42 is normally closed by a check-valve 43 which opens inwardly into the valve chamber 41, and which is provided with an axial stem 44. Threaded through the outer end wall of the valve housing section 39, in aligned opposition to the primary port 42, is a plug 45, which is provided, in its inner end portion, with an axial guideway 46 in which the stem 44 of the check-valve 43 is slidably supported. Said check-valve 43 is yieldably held in normal closed relation to the primary port 42 by a compression spring 47, of relatively light tension, which is mounted between said check-valve and said plug 45. The valve housing section 39 is further provided, adjacent the opposite side thereof, with a secondary port 48 which opens out from the interior of the valve chamber 41, the outer end of said secondary port being closed. The interior of said secondary port 48 is connected in communication with the interior of said primary port 42 by a transverse passage or duct 49 of comparatively small cross-sectional area. Cooperative with an end of said passage or duct 49 is the conical end 50 of a regulator screw 51 which is threaded through a side of the valve housing section 39. Manipulation of the regulator screw is adapted to desirably adjust the effective cross-sectional area of the passage or duct 49. Said secondary port 48 is normally closed by a manipulatable valve 52 which opens inwardly into the valve chamber 41, and which is provided with an axial stem 53. Threaded through the outer end wall of the valve housing section 39, in aligned opposition to the secondary port 48, is a gland plug 54. Said gland plug 54 is provided with an endwise open axial slideway 55 which extends therethrough, so that the valve stem 53 projects exteriorly from the outer end of the valve housing section 39. Said manipulatable valve 52 is yieldably held in normal closed relation to the secondary port 48 by a compression spring 56 of comparatively strong tension, and which is mounted between said valve and the inner end of said gland plug. Means is provided for actuating said manipulatable valve 52, said means comprising a fulcruming bracket 57 which is suitably affixed to the external end of the gland plug 54. Pivotally supported by said bracket 57 is a valve actuating lever 58, which is provided with a bifurcated portion 59 through which the exterior end portion of the valve stem 53 extends. A stop nut or other suitable means 60, with which the outer end of said valve stem 53 is provided, is engaged by the actuating lever 58, so that, upon outswinging movement of the latter, drag is exerted upon the valve stem 53 which is adapted to move the valve 52 against the tension of spring 56 to open position. Connected with the free end of said actuating lever 58 is a pull cable 61. Said pull cable extends forwardly to the outer end of the discharge arm 13, where it may be passed downwardly through a guide loop 62, which is mounted on the latter, to hang adjacent to the drop pipe 14 (as shown in Fig. 1) subject to convenient manipulation. The interior of the cylinder 25, by-pass conduit or pipe 37 and interconnecting passages are filled with a suitable liquid, such e. g. as oil O.

In operation, when the discharge arm 13 is down-swung to service position against the tension of the counterbalancing springs 24, to dispose the drop pipe 14 in position for discharge of liquid to a tank or other receiver desired to be filled, the down swinging movement of said discharge arm 13 exerts an outward pull upon the cylinder 25 to which said arm is connected, so that said cylinder moves outwardly along the anchored piston rod 29, and relative to the stationary piston 32 which is fixed on said piston rod. Such movement of the cylinder 25 causes, in effect, a movement of the piston 32 from its normal initial position adjacent the outer end of the cylinder toward the inner end of the latter. Such relative movements of the cylinder 25 and piston 32 forces the oil O, which is intermediate the rearward face of the piston and inner end of the cylinder, to flow in counterclockwise direction through the passage 36, by-pass conduit or pipe 37 and thence through the port 42, whereby pressure is exerted upon the check-valve 43 so that the same opens, thus permitting the oil to pass, by way of the valve chamber 41 and passage 40 back into the cylinder 25 intermediate the outer end of the latter and the forward end of the piston 32.

By reason of the restricted area of the regulatable passage or duct 49 intermediate the ports 42 and 48 leading to the manipulatable valve 52 relative to the relatively large area of said port 42, the path of least resistance to flow of oil in said counterclockwise direction is through the latter port, and since the check-valve 43 is biased to closed position by spring 47 of relatively light tension whereas the manipulatable valve 52 is biased to closed position by spring 56 of much stronger tension, only said check-valve 43 will open to the pressure of counterclockwise flowing oil.

When the down-swung discharge arm 13 is arrested in desired lowered position, the counterbalancing springs 24 function to exert up-swinging pull upon said discharge arm, with accompanying tendency to reverse the above described relative movements of the cylinder 25 and piston 32, so that the direction of oil flow pressure is reversed, thus tending to cause flow of the oil in clockwise direction. The reversed pressure of the oil is applied to the check-valve 43 and manipulatable valve 52 in direction to force the same in tight sealing and closing relation to the ports 42 and 48, thus preventing circulating flow of the oil. It will be obvious that, under these circumstances, relative movements of the cylinder 25 and piston 32 are prevented, and consequently the discharge arm 13 is positively detained and strongly held in its lowered position against upswinging movement under the pull of the counterbalancing springs 24. By reason of this, the discharge arm 13 and drop pipe 14 are automatically held down in desired liquid loading position, without necessity for use of manually applied hold down force. Since the piston rod 29 extends entirely through the interior of the cylinder in all positions of the latter, the volume of oil displacement from one end of the cylinder is always equaled by the volume of oil returned to the opposite end of the cylinder, and consequently there is no lost motion between the cylinder and piston at any time, and therefore no back lash play of the lowered discharge arm 13.

After a desired loading operation has been completed, and it is desired to permit the discharge arm 13 and drop pipe 14 to return to normal initial up-swung out of service position under the pull of the counterbalancing springs 24, such action may be quickly and easily initiated by pulling on the pull cable 61. The pull of said cable 61 swings outward the actuating lever 58, so that the movement thereof effects an outward pull on the stem 53 of the manipulatable valve 52, which withdraws the latter, against tension of its spring 56, from its port closing position, thus opening the port 48 to outward flow of oil O therethrough. Under these conditions oil is permitted to flow in clockwise direction through the by-pass conduit or pipe 37 from the outer end of the cylinder 25 to the inner end thereof, so as to no longer obstruct the pull of the counterbalancing springs 24, and consequently the latter are permitted to exert the desired up-swinging pull upon the discharge arm 13. When the discharge arm reaches the limit of its up-swing, and the pull cable is relaxed, the valve 52 will close, and the apparatus resumes normal initial condition ready for repetition of the above described operations.

It is desirable that minimum resistance be offered to manually effect down-swinging movement of the discharge arm 13 to service position, so that such movement may be effected with a minimum of physical effort; on the other hand, it is also desirable that sufficient resistance to up-swinging movement of said discharge arm to out of service position be provided for, so that the latter movement, as automatically induced by the pull springs 24, will be relatively slow, whereby to avoid shock stresses and strains which might otherwise result upon sudden or abrupt arrest of the movement when the discharge arm completes its up-swing to normal initial raised position. These desiderata are attained by reason of the fact that the port 42 is of maximum area, thus permitting rapid and easy flow of oil O in the above described counterclockwise direction, whereas the restricted path of oil flow in the opposite direction which is provided by the passage or duct 49, retards the flow in such direction, and consequently permits the discharge arm 13 to slowly swing up to normal initial raised position without occurrence of shock. The rate of retarded oil flow in clockwise direction may be desirably regulated by manipulating the regulator screw 51; this, coupled with the fact that the tension of the pull springs 24 may also be adjusted, permits attainment of desired predetermined speed of discharge arm upswing.

Referring to Fig. 8, the valve housing section 39 is modified to provide a single port 42' with which the by-pass conduit or pipe 37 communicates. Said port 42' is normally closed by a check-valve 43' which is biased to port closing position by a compression spring 47'. The stem 44' of said check-valve 43' slidably extends through an axial guideway 46 with which a gland plug 45' is provided; said gland plug being threaded into the outer end wall of the valve housing section 39. Affixed to the outer end of said gland plug 45' is a fulcruming bracket 57'. Pivotally supported by said bracket 57' is a valve actuating lever 58', which is provided with a bifurcated portion 59', through which the outer end of the valve stem 44' extends. A stop nut or other similar means 60', with which the outer end of said valve stem 44' is provided, is engageable by the actuating lever 58'.

In the operation of the aforesaid modified form of valve means, the check-valve 43' will yield to counterclockwise flow of oil O when the discharge arm 13 is manually down-swung. To permit return of the down-swung discharge arm 13, under the pull of the counterbalancing springs 24, said check-valve 43' may be manually opened to permit reverse or clockwise flow of oil, by outswinging the actuating lever 58' to exert drag upon the valve stem 44', whereby to open the check-valve 43' against the tension of its closing spring 47'.

It will be understood that various changes could be made in the constructions and arrangements of the above described structure and its parts and elements without departing from the spirit of this invention within the scope of the here-following claims. It is therefore intended that all matter contained in the above description or shown in the accompanying drawings shall be interpreted as illustrative and not in a limiting sense.

We claim:

1. In combination with a pivoted arm having counter-balancing means to bias the same to a given normal initial position, a hydraulic detent means adapted to be actuated by movement of said arm from normal initial position whereby to automatically hold said arm in the position to which it is thus moved against the biasing stress of said counterbalancing means, said hydraulic detent means comprising relatively movable cylinder and piston elements, one said element being fixed against longitudinal movement and the other element being connected with said arm so as to be longitudinally moved thereby, a by-pass passage means communicating between opposite ends of said cylinder, valve means yieldable to flow of fluid through said by-pass passage means in one direction when relative movements of the cylinder and piston elements are induced by movement of the arm from its normal initial position, and means for manually opening said valve means to flow of fluid through said by-pass passage means in the opposite direction, whereby to release said arm for return to normal initial position.

2. In combination with a pivoted arm having counterbalancing means to bias the same to a given normal initial position, a hydraulic detent means adapted to be actuated by movement of said arm from normal initial position whereby to automatically hold said arm in the position to which it is thus moved against the biasing stress of said counterbalancing means, said hydraulic detent means comprising relatively movable cylinder and piston elements, one said element being fixed against longitudinal movement and the other element being connected with said arm so as to be longitudinally moved thereby, a by-pass passage means communicating between opposite ends of said cylinder, valve chamber means in communication with one end of said cylinder, said latter means having one port of major area and a second port of minor area each communicating with said by-pass passage means, a check-valve adapted to close said first port, said check valve being yieldable to flow of fluid through said by-pass passage means in one direction when relative movements of the cylinder and piston elements are induced by movement of said arm from its normal initial position, and a manipulatable valve adapted to close said second port, said latter valve being adapted to be manually opened to flow of fluid through the by-pass passage means in the opposite direction thereby to release said arm for return to normal initial position by said counterbalancing means.

3. In combination with a pivoted arm having counterbalancing means to bias the same to a given normal initial position, a hydraulic detent means adapted to be actuated by movement of said arm from normal initial position whereby to automatically hold said arm in the position to which it is thus moved against the biasing stress of said counterbalancing means, said hydraulic detent means comprising relatively movable cylinder and piston elements, one said element being fixed against longitudinal movement and the other element being connected with said arm so as to be longitudinally moved thereby, a by-pass passage means communicating between opposite ends of said cylinder, valve chamber means in communication with one end of said cylinder, said latter means having one port of major area and a second port of minor area each communicating with said by-pass passage means, a check-valve adapted to close said first port, said check-valve being yieldable to flow of fluid through said by-pass passage means in one direction when relative movement of the cylinder and piston elements are induced by movement of said arm from its normal initial position, a manipulatable valve adapted to close said second port, said latter valve being adapted to be manually opened to flow of fluid through the by-pass passage means in the opposite direction whereby to release said arm for return to normal initial position by said counterbalancing means, and means to regulate the effective area of said second port.

4. In combination with a pivoted arm having counterbalancing means to bias the same to a given normal initial position, a hydraulic detent means comprising a cylinder member, a piston rod member extending entirely through said cylinder member, and a piston fixed on said piston rod member within said cylinder, one said member being fixed against longitudinal movement and the other said member being connected with said arm so as to be longitudinally moved thereby, a by-pass passage means communicating between opposite ends of said cylinder member, valve means yieldable to flow of fluid through said by-pass passage means in one direction when relative movements of the cylinder member and piston are induced by movement of the arm from its normal initial position, and means for manually opening said valve means to flow of fluid through said by-pass passage means in the opposite direction, whereby to release said arm for return to normal initial position by said counterbalancing means.

5. In combination with a pivoted arm having counterbalancing means to bias the same to a given normal initial position, a hydraulic detent means comprising a cylinder member, a piston rod member extending entirely through said cylinder member, and a piston fixed on said piston rod member within said cylinder, one said member being fixed against longitudinal movement and the other said member being connected with said arm so as to be longitudinally moved thereby, a by-pass passage means communicating between opposite ends of said cylinder member, valve chamber means in communication with one end of said cylinder, said latter means having one port of major area and a second port of minor area each communicating with said by-pass passage means, a check-valve adapted to close said first port, said check-valve being yieldable to flow of fluid through said by-pass passage means in one direction when relative movements of the cylinder and piston elements are induced by movement of said arm from its normal initial position, a manipulatable valve adapted to close said second port, said latter valve being adapted to be manually opened to flow of fluid through the by-pass passage means in the opposite direction whereby to release said arm for return to normal initial position by said counterbalancing means.

6. In combination with a pivoted arm having counterbalancing means to bias the same to a given normal initial position, a hydraulic detent means comprising a cylinder member, a piston rod member extending entirely through said cylinder member, and a piston fixed on said piston rod member within said cylinder, one said member being fixed against longitudinal movement and the other said member being connected with said arm so as to be longitudinally moved thereby, a by-pass passage means communicating between opposite ends of said cylinder member, valve chamber means in communication with one end of said cylinder, said latter means having one port of major area and a second port of minor area each communicating with said by-pass passage means, a check-valve to close said first port, said check-valve being yieldable to flow of fluid through said by-pass passage means in one direction when relative movements of the cylinder and piston elements are induced by movement of said arm from its normal initial position, a manipulatable valve adapted to close said second port, said latter valve being adapted to be manually opened to flow of fluid through the by-passage means in the opposite direction whereby to release said arm for return to normal initial position by said counterbalancing means, and means to regulate the effective area of said second port.

7. A hydraulic detent means for cooperation with a swingable discharge arm of a loading conduit system which is counterbalanced to an upswung out of service position, said detent means comprising a fluid filled cylinder, a piston in said cylinder, a fixed anchoring means offset from the fulcrum of said discharge arm, means to interconnect said cylinder and piston between said anchoring means and said discharge arm, by-pass passage means communicating between opposite ends of said cylinder, a check valve in the line of said by-pass passage means, said check-valve being yieldable to circulation of fluid through the by-pass passage means induced by relative movements of said piston and cylinder caused by down swinging movement of said discharge arm, and manipulatable means operative to open said check-valve for reverse circulation of fluid through the by-pass passage means whereby to permit counterbalanced up-swing of the down-swung discharge arm.

8. A hydraulic detent means for cooperation with a swingable discharge arm of a loading conduit system which is counterbalanced to an upswung out of service position, said detent means comprising a fluid filled cylinder, a piston in said cylinder, a fixed anchoring means offset from the fulcrum of said discharge arm, said cylinder and piston being interconnected between said discharge arm and said fixed anchoring means, by-pass passage means communicating between opposite ends of said cylinder, valve chamber means in communication with one end of said cylinder, said latter means having one port of major area and a second port of minor area each communicating with said by-pass passage means, a check-valve adapted to close said first port, said check valve being yieldable to flow of fluid through said by-pass passage means in one direction when relative movements of the cylinder and piston elements are induced by movement of said discharge arm to downswung service position, a manipulatable valve adapted to close said second port, said latter valve being adapted to be manually opened to flow of fluid through the by-pass passage means in the opposite direction whereby to release said discharge arm for counterbalanced return to upswung position.

9. A hydraulic detent means for cooperation with a swingable discharge arm of a loading conduit system which is counterbalanced to an upswung out of service position, said detent means comprising a fluid filled cylinder, a piston rod extending entirely through said cylinder, a piston fixed on the piston rod within said cylinder, a fixed anchoring means offset from the fulcrum of said discharge arm, said cylinder and piston rod being interconnected between said discharge arm and said fixed anchoring means, by-pass passage means communicating between opposite ends of said cylinder, valve chamber means in communication with one end of said cylinder, said latter means having one port of major area and a second port of minor area each communicating with said by-pass passage means, a check-valve adapted to close said first port, said check-valve being yieldable to flow of fluid through said by-pass passage means in one direction when relative movements of the cylinder and piston elements are induced by movement of said discharge arm to downswung service position, a manipulatable valve adapted to close said second port, said latter valve being adapted to be manually opened to flow of fluid through the by-pass passage means in the opposite direction whereby to release said discharge arm for counterbalanced return to upswung position, and means to regulate the effective area of said second port.

HOWARD CHESTER KRONE.
WILLIAM MEYER.

REFERENCES CITED

The following references are of record in the file of this patent:

UNITED STATES PATENTS

| Number | Name | Date |
|---|---|---|
| 716,168 | Ball | Dec. 16, 1902 |
| 719,483 | Mansfield | Feb. 3, 1903 |
| 1,113,330 | Greenway | Oct. 13, 1914 |
| 1,165,230 | Degen | Dec. 21, 1915 |
| 2,090,136 | McKee | Aug. 17, 1937 |
| 2,282,652 | Henning | May 12, 1942 |
| 2,319,068 | Krone | May 11, 1943 |
| 2,339,469 | Emanuel | Jan. 18, 1944 |
| 2,368,993 | McGarry | Feb. 6, 1945 |